(12) United States Patent
Takeuchi

(10) Patent No.: US 8,511,556 B2
(45) Date of Patent: Aug. 20, 2013

(54) CARD READER

(75) Inventor: Junro Takeuchi, Nagano (JP)

(73) Assignee: Nidec Sankyo Corporation (JP)

( * ) Notice: Subject to any disclaimer, the term of this patent is extended or adjusted under 35 U.S.C. 154(b) by 199 days.

(21) Appl. No.: 12/920,252

(22) PCT Filed: Feb. 27, 2009

(86) PCT No.: PCT/JP2009/000877
§ 371 (c)(1),
(2), (4) Date: Dec. 1, 2010

(87) PCT Pub. No.: WO2009/107390
PCT Pub. Date: Sep. 3, 2009

(65) Prior Publication Data
US 2011/0084137 A1 Apr. 14, 2011

(30) Foreign Application Priority Data
Feb. 29, 2008 (JP) ................................. 2008-050368

(51) Int. Cl.
*G06K 13/00* (2006.01)
(52) U.S. Cl.
USPC ........................................ 235/437; 235/475
(58) Field of Classification Search
USPC .............................................. 235/437, 486
See application file for complete search history.

(56) References Cited

U.S. PATENT DOCUMENTS

| | | | | |
|---|---|---|---|---|
| 5,821,525 A | * | 10/1998 | Takebayashi | 235/492 |
| 5,917,177 A | * | 6/1999 | Owa et al. | 235/486 |
| 6,216,954 B1 | * | 4/2001 | Kuwamoto et al. | 235/486 |
| 6,776,338 B2 | * | 8/2004 | Watanabe | 235/441 |
| 2005/0048949 A1 | * | 3/2005 | Uchida et al. | 455/407 |

FOREIGN PATENT DOCUMENTS

| | | |
|---|---|---|
| EP | 1510961 A1 | 3/2005 |
| JP | 2002-342723 A | 11/2002 |
| JP | 2005-071102 A | 3/2005 |

OTHER PUBLICATIONS

International Search Report for Application No. PCT/JP2009/000877 with English translation mailed on Jun. 9, 2009.

* cited by examiner

*Primary Examiner* — Thien M Le
(74) *Attorney, Agent, or Firm* — Cantor Colburn LLP

(57) ABSTRACT

A card reader may include a reader-side non-contact communication antenna, a transfer path through which a card is transferred, a transfer mechanism to transfer the card, a controller to control the transfer mechanism, and a regulator to regulate transfer of the card. The reader-side antenna may be provided proximate to the transfer path. The regulator may be positioned such that the reader-side antenna can communicate with a card-side antenna on the card. The controller may control the transfer mechanism to move the card closer to the regulator or away from the regulator after the card has stopped once, so as to enable communication between the reader-side antenna and the card-side antenna.

12 Claims, 5 Drawing Sheets

CARD READER

CROSS REFERENCE TO RELATED APPLICATIONS

This is a U.S. national stage of international application No. PCT/JP2009/000877, filed on Feb. 27, 2009. Priority under 35 U.S.C. §119(a) and 35 U.S.C. §365(b) is claimed from Japanese Application No. 2008-050368, filed Feb. 29, 2008, the disclosure of which is also incorporated herein by reference.

FIELD OF THE INVENTION

The present invention relates to a card reader for recording and/or reproducing information into/from one of various kinds of cards such as banking cards and credit cards.

BACKGROUND

As cards to be used in financial institutions and other facilities for the purpose of realization of cashless service and personal authentication, conventionally there are a magnetic card in which a magnetic stripe is formed on a surface of the card, and an IC card in which an integrated-circuit chip (IC chip) is embedded internally and an IC terminal is placed on a surface of the card. Furthermore, widely spreading is a use of a non-contact IC card in which an IC chip and a communication antenna (an antenna coil) are embedded, and with which information is transmitted through electromagnetic induction. Such a non-contact IC card has the advantage that operations of the card at the time of recording and/or reproducing information are not badly affected by contamination and abrasion of a surface of the card.

In order to record and/or reproduce information into/from a magnetic card and an IC card, used is a magnetic card reader equipped with a magnetic head and an IC contact, respectively. In the meantime, for recording and/or reproducing information into/from a non-contact IC card, used is a non-contact card reader equipped with a non-contact communication antenna (Refer to Patent Document 1).

The IC card reader disclosed in Patent Document 1 is a conventional type of magnetic card reader additionally including the function of a non-contact card reader. Being compared with a non-contact card reader of a type, over which a card is held in operation, the above IC card reader is different from that type of non-contact card reader from the viewpoint that a card communication distance is kept to be always constant. Moreover, in general, a card reader internally has quite a few of metal parts, and therefore the non-contact communication antenna must be located at a position where the electromagnetic characteristics of the non-contact communication antenna are preferably less impaired. Accordingly, in the case of a type of card reader equipped with a non-contact communication antenna internally, such as the IC card reader described above, sometimes it may be required to adjust the position of the non-contact communication antenna at the design phase or the evaluation phase just before the product delivery.

Patent Document 1: Japanese Unexamined Patent Application Publication No. 2002-342723

However, non-contact IC cards being used actually have their own unique characteristics according to specifications of their ICs being used, antenna shapes, and other factors. Accordingly, though it is preferable to adjust the position of the non-contact communication antenna through testing communications with various non-contact IC cards being used as many as possible in order to improve general versatility, the adjustment work itself becomes complicated.

At least an embodiment of the present invention provides a card reader that is able to have an increased accuracy in communication with non-contact IC cards even when the non-contact IC cards have their own specific characteristics within the allowable standard range.

SUMMARY

To achieve above, at least an embodiment provides the following aspects.

(1) A card reader including: an information processing means of a contact type for recording/reproducing information by using at least one of a magnetic head and an IC contact that contact a card; an information processing means of a non-contact type for recording/reproducing information through electromagnetic induction having no physical contact with the card; a transfer path through which the card is transferred; and a regulating means for regulating the transfer of the card; wherein the information processing means of a non-contact type includes a reader-side non-contact communication antenna that can communicate with a card-side non-contact communication antenna built in the card; the reader-side non-contact communication antenna is placed in the proximity of the transfer path, meanwhile the regulating means is positioned in an area where the information processing means of a non-contact type can communicate with the card-side non-contact communication antenna; and the card once having stopped further moves either in a direction to move away from the regulating means or in a direction to come close to the regulating means, and then the card stops there to subsequently perform communication with the reader-side non-contact communication antenna.

According to at least an embodiment of the present invention; the card reader includes an information processing means of a contact type, an information processing means of a non-contact type having a reader-side non-contact communication antenna, a transfer path, and a regulating means for regulating the transfer of the card. The reader-side non-contact communication antenna is placed in the proximity of the transfer path, meanwhile the regulating means is positioned in an area where the information processing means of a non-contact type can communicate with the card-side non-contact communication antenna. The card once having stopped in the transfer path further moves either in a direction to move away from the regulating means or in a direction to come close to the regulating means, and then the card stops there to subsequently perform communication with the reader-side non-contact communication antenna. Therefore, the non-contact communication can be performed accurately.

In other words, for communication with the reader-side non-contact communication antenna, the card is transferred into an area where the card can communicate with the reader-side non-contact communication antenna, and once stops there. Afterwards, when an error happens in non-contact communication, the card can be moved back and forth along the transfer path to enable the communication with the card by modifying the resonant frequency, the impedance value, and so on. As a result, probability of disabled non-contact communication can be decreased.

(2) The card reader; wherein the card stops, being away from the regulating means.

According to at least an embodiment of the present invention; the card described above stops, being away from the regulating means, and therefore as described above, probability of disabled non-contact communication can be decreased.

Furthermore, since the card is moved without contacting the regulating means, the card and mechanical parts of the card reader can be free from damages and harmful effects due to collision of the card against the mechanical parts.

(3) The card reader; wherein the regulating means is located in the proximity of an end of the transfer path in a card inserting direction.

According to at least an embodiment of the present invention; the regulating means is located in the proximity of the end of the transfer path in the card inserting direction. Therefore, this arrangement has an advantage especially in the case where a non-contact communication function is added to an existing magnetic card reader. For more in details, when a non-contact communication function is added to an existing magnetic card reader, there exists a restriction on the layout of the hardware structure. For example, sometimes the non-contact communication antenna may be placed at a rear section (an end section) of the card reader, meanwhile the regulating means may be located at the end of the transfer path. In such a case, it becomes impossible from the viewpoint of the mechanical structure to have the center of the reader-side non-contact communication antenna and the center of the card-side non-contact communication antenna face each other. However, even in this case, the card stops, being away from the regulating means, and therefore probability of disabled non-contact communication can be decreased.

(4) The card reader; wherein the card once having stopped further moves step by step repeatedly either in a direction to move away from the regulating means or in a direction to come close to the regulating means, and then the card stops there to subsequently perform communication with the reader-side non-contact communication antenna.

According to at least an embodiment of the present invention; once having stopped at a position away from the regulating means, the card further moves step by step repeatedly (for several steps) either in a direction to move away from the regulating means or in a direction to come close to the regulating means, and then the card stops there to subsequently perform communication with the reader-side non-contact communication antenna. Therefore, preventing an increase of the operation time due to a harmful effect of moving the card continually, this operation can modify the resonant frequency, the impedance value, and so on.

According to at least an embodiment of the present invention as described above, for communicating with the reader-side non-contact communication antenna, the card is transferred into an area where it becomes possible to communicate with the reader-side non-contact communication antenna, and stops there. Afterwards, when an error happens in non-contact communication, the card can be moved back and forth along the transfer path to enable the communication with the card by modifying the resonant frequency, the impedance value, and so on. As a result, probability of disabled non-contact communication can be decreased.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE PREFERRED EMBODIMENTS

At least an embodiment of the present invention is described below with reference to the accompanying drawings.

Figure 1:
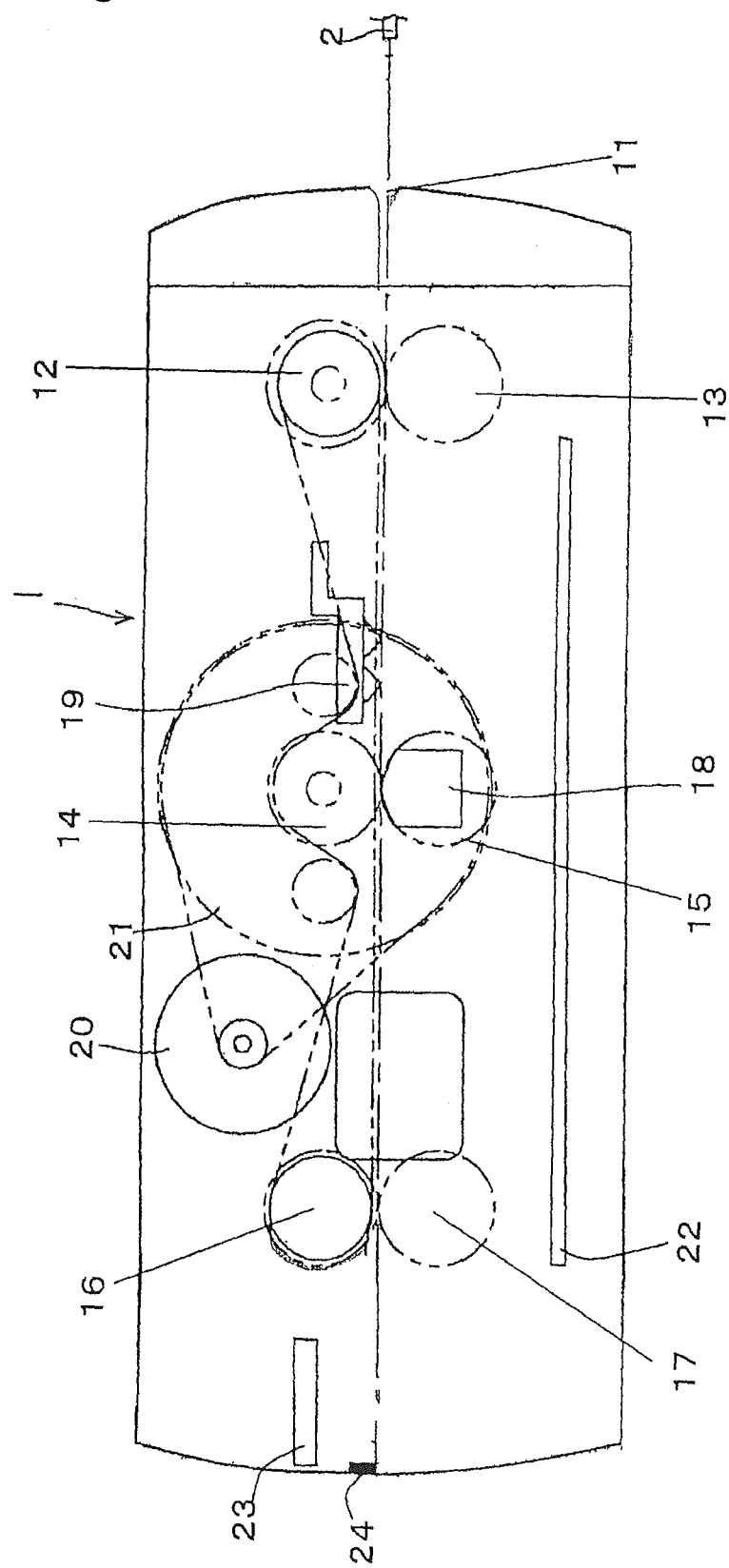
FIG. 1 is a sectional view showing a mechanical structure of a card reader according to an embodiment of the present invention.

FIG. 1 is a sectional view showing a mechanical structure of a card reader 1 according to an embodiment of the present invention. The card reader 1 shown in FIG. 1 is built in a higher-level device such as an automated teller machine (ATM: a host machine), and the card reader 1 receives commands from the higher-level device, and sends command execution results and the like to the higher-level device, through an interface. Furthermore, being equipped with a magnetic head 18 and an IC contact 19, the card reader 1 shown in FIG. 1 is a hybrid machine that can handle both magnetic cards and IC cards. Still further, being equipped with a non-contact communication antenna 23, the card reader 1 has a configuration additionally including a non-contact communication function. Incidentally, a right hand side and a left hand side in FIG. 1 are a front side and a rear side of the card reader 1, respectively.

Holding and transferring a card 2 inserted into a transfer path for transferring the card 2 by using a transfer means, the card reader 1 records and reproduces information to/from the card with the magnetic head 18 or the IC contact block structure 19 individually. As shown in FIG. 1, the card reader 1 includes: a card insertion slot 11 working as an inlet for the card 2 that is any one of a magnetic card, an IC card, and the like; the transfer means or transfer mechanism for transferring the card 2 inserted; a driving motor 20 for driving the transfer means; a pulley 21 for transmitting the power of the driving motor 20 to the transfer means; the magnetic head 18 with which a reading/writing operation (i.e., recording/reproducing information) is carried out while the magnetic head 18 contacting with and sliding on a magnetic stripe on the card; the IC contact (the IC contact block structure) 19 that can communicate with the card 2 (for recording/reproducing information) through contacting an IC terminal of the card 2 transferred to a predetermined communicating position; a circuit board 22 for controlling the magnetic head 18 and the IC contact 19; a reader-side non-contact communication antenna 23 for sending/receiving information (i.e., recording/reproducing information) by electromagnetic induction to/from a card-side non-contact communication antenna built in the card 2; and a stopper 24 for preventing the card 2 from jumping out of the card reader 1.

In the present embodiment, the transfer means includes 3 pairs of transfer rollers; namely driving rollers 12, 14, and 16 and driven rollers 13, 15, and 17, as shown in FIG. 1. Each couple of these pairs of transfer rollers are so placed as to face each other, presenting at the transfer path for transferring the card 2. Then, the card 2 inserted in the transfer path is held and transferred by each couple of rollers, i.e., the driving roller 12 and the driven roller 13 (by another couple of the driving roller 14 and the driven roller 15, as well as still another couple of the driving roller 16 and the driven roller 17, in the same manner).

In the present embodiment, the stopper 24 works as an example of a 'regulating means' for regulating transfer operation of the card 2; and for example, a framework (frame) of the card reader 1 may be used as the regulating means. The transfer path for transferring the card 2 is prepared between the card insertion slot 11 and the stopper 24. In the meantime, the driving rollers 12, 14, and 16 are individually supported by driving shafts (provided with no reference numeral), meanwhile a transmission belt (indicated with a chain double-dashed line in FIG. 1) is assembled on these driving shafts through pulleys (provided with no reference numeral). Furthermore, either a pulley or a gear 21 is fixed onto the driving shaft of the driving roller 14, meanwhile a belt driven by the driving motor 20 is assembled on the driving shaft. In addition, provided are other devices such as an encoder for detecting an RPM of the driving motor 20 and a position detecting sensor for detecting an edge and the like of the card 2 inserted into the card reader 1, although these devices are not shown in the figure.

Provided as a tangible example of the encoder is, for example, an optical encoder. Such an optical encoder includes an attachment roller, in which a plurality of passing light apertures are formed separately in a circumferential direction. When the attachment roller rotates, the plurality of passing light apertures intermittently prevent a prepared detection light from passing through them. Then, intermittent change of the detection light is detected by means of a photo acceptance element or the like, and the detected change is converted into an electrical pulse signal. Thus, being located at the transfer path, the attachment roller rotates when the roller 14 turns, or in other words, when the card 2 is transferred; so that a pulse signal corresponding to the driving operation of the transfer means (turning of the roller 14) can be detected. As a result, it can be checked whether or not the card 2 has been transferred inside the card reader 1, whether or not the card 2 has been jammed in the transfer path (namely, card jamming has happened), and the like.

Provided as a tangible example of the position detecting sensor is, for example, an optical sensor. More concretely to describe, a light emitting element (photo diode) and a photo acceptance element (photo sensor) are so placed as to sandwich the transfer path. Then, at the time when the card 2 intercepts the passing light of the sensor, it is recognized that the card 2 (an end of the card 2) passes through. Placement of a plurality of such optical sensors makes it possible to recognize a position of the card 2 in the transfer path.

The magnetic head 18 comes in contact with and slides on the magnetic stripe formed on the surface of the card 2, in order to read magnetic data recorded in the magnetic stripe and create a reproduced signal according to the magnetic data. The IC contact 19 includes a plurality of metallic terminals (such as coil springs) for actually contacting an IC terminal (not shown) on the card 2, the metallic terminals being so placed as to face the transfer path. Furthermore, the IC contact 19 can come close to as well as move away from the card 2, and the IC contact 19 receives/sends a signal while coming into contact with or being away from a surface of the card 2. The magnetic head 18 and the IC contact 19 are controlled by means of a magnetic card reading/writing circuit and an IC card reading/writing circuit, respectively, (both the circuits being not shown) included in the circuit board 22.

The reader-side non-contact communication antenna 23 performs communication by electromagnetic induction with an IC chip embedded in the card 2, through the card-side non-contact communication antenna; and the reader-side non-contact communication antenna 23 is placed in the proximity of the transfer path, and controlled by means of a non-contact communication circuit included in the circuit board 22.

In the present embodiment, the stopper 24 is located within an area that enables the reader-side non-contact communication antenna 23 to perform communication with the card-side non-contact communication antenna. Characteristically, the card 2 stops at a position, being away from the stopper 24.

Figure 2:
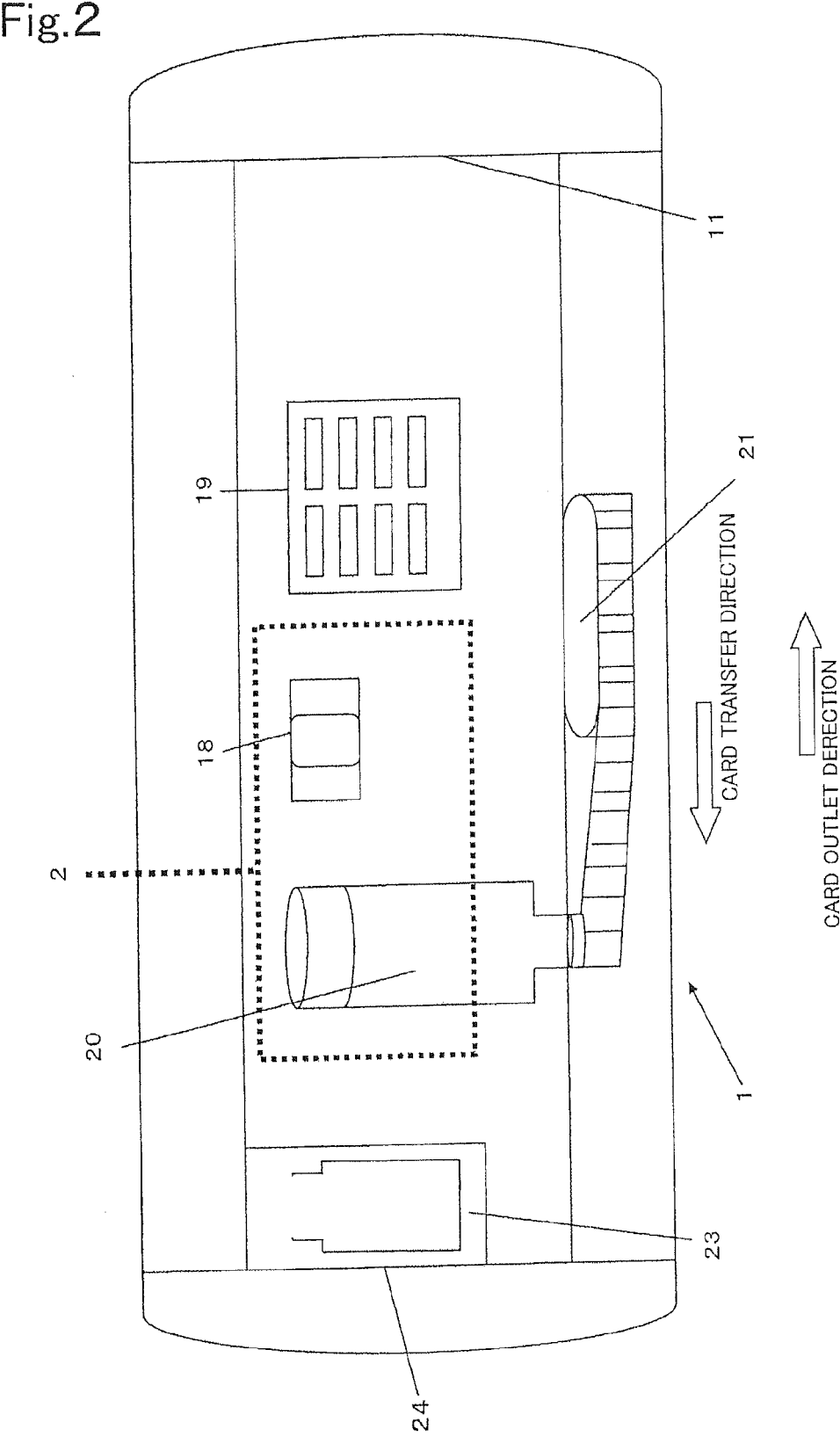
FIG. 2 is a schematic plan view showing the mechanical structure of the card reader.
Figure 3:
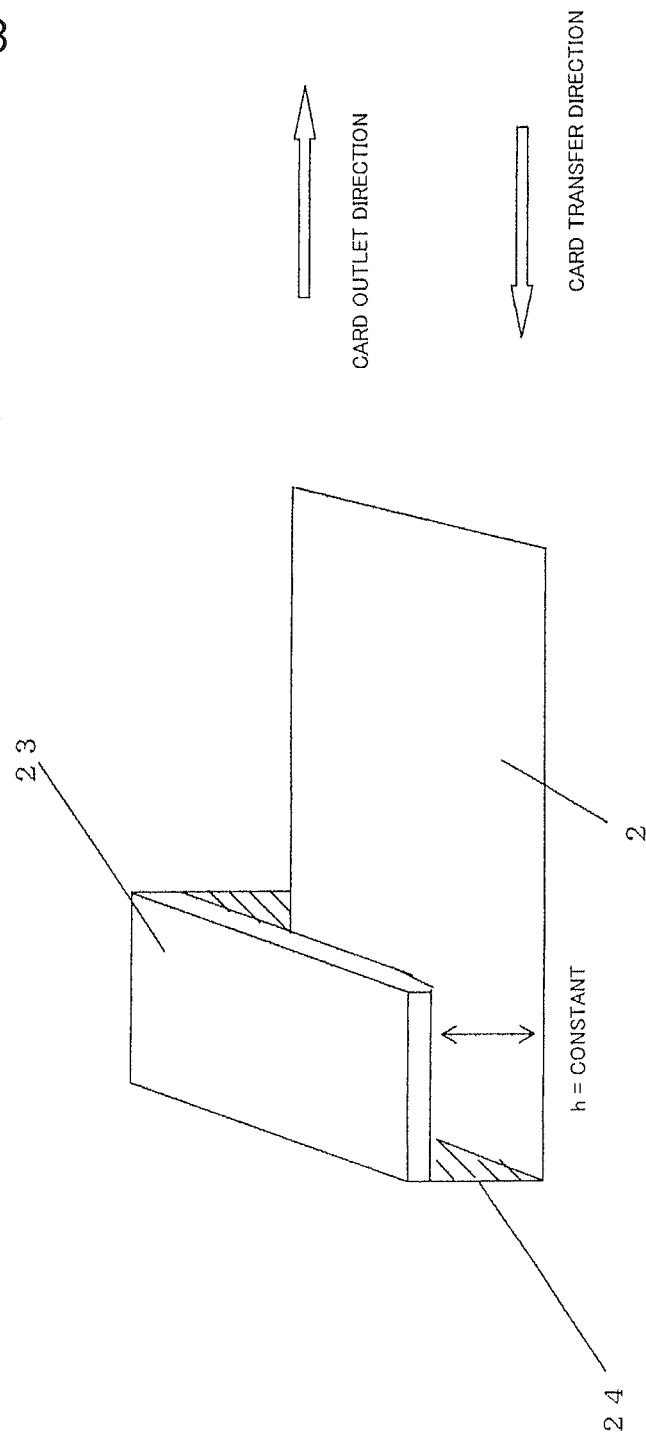
FIG. 3 is a perspective view focusing on an area surrounding a reader-side non-contact communication antenna.
Figure 4:
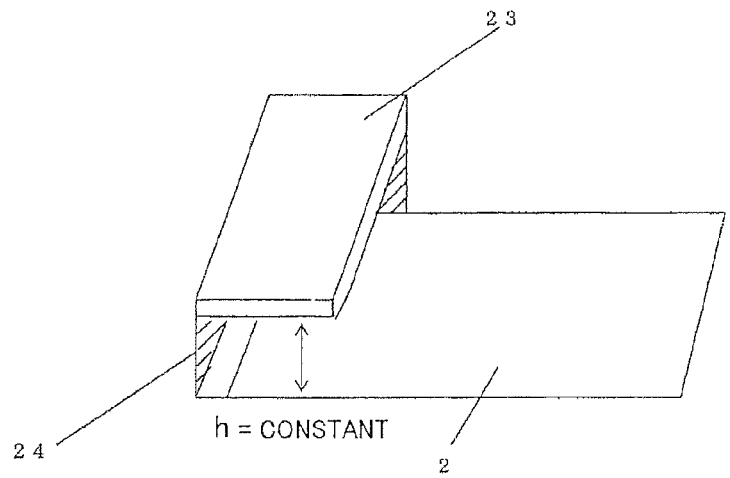
FIGS. 4A to 4C show conditions of a card moving in a direction to come close to a stopper, and in another direction to move away from the stopper.
Figure 4:
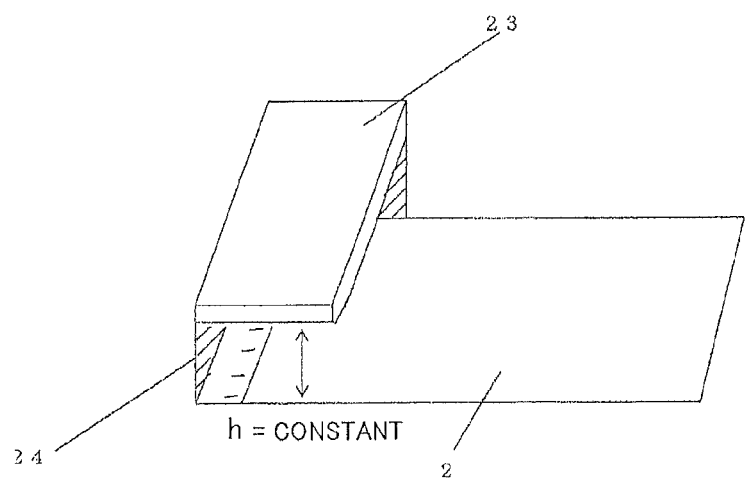
Figure 4:
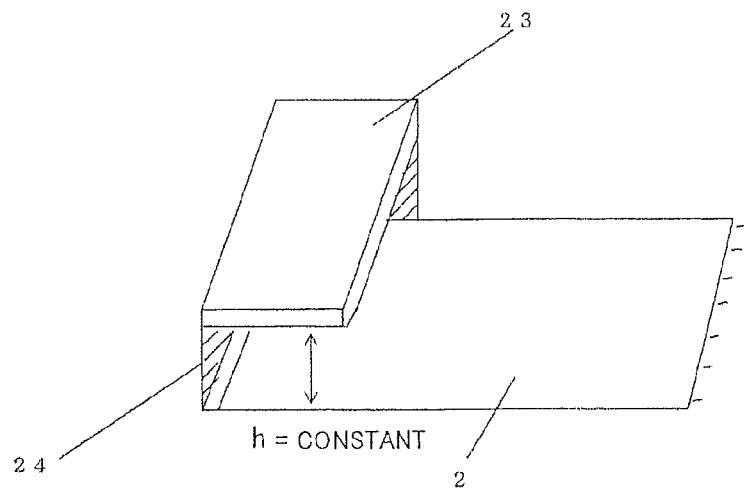

The present embodiment is more specifically described below with reference to FIGS. 2 to 4. FIG. 2 is a schematic plan view showing the mechanical structure of the card reader 1. FIG. 3 is a perspective view focusing on an area surrounding the reader-side non-contact communication antenna 23. FIGS. 4A to 4C show conditions of the card 2 moving in a direction to come close to the stopper 24, and in another direction to move away from the stopper 24. FIG. 3 shows a condition of the card 2 being in contact with the stopper 24.

As shown in FIG. 2, the stopper 24 in the present embodiment is located in the proximity of an end (the left end) of the transfer path in an inserting direction for forwarding the card 2. This layout results from an addition of a non-contact communication function to a conventional device. As a general rule, a center of the card-side non-contact communication antenna of the card 2 is preferably positioned so as to meet a center of the reader-side non-contact communication antenna 23. However, if the non-contact communication function is added to at a later stage, the reader-side non-contact communication antenna 23 should necessarily be located at a rear side section of the transfer path as shown in FIG. 2. Furthermore, from a viewpoint of locating the reader-side non-contact communication antenna 23 at a position being away from a metallic part of the card reader 1, the reader-side non-contact communication antenna 23 should necessarily be located at the position shown in FIG. 2. Under such a condition, it inevitably becomes difficult to locate the center of the card-side non-contact communication antenna of the card 2 at a position to meet the center of the reader-side non-contact communication antenna 23. Then, in the present embodiment, for communication with the reader-side non-contact communication antenna 23, the card 2 is transferred into an area where the communication with the reader-side non-contact communication antenna 23 can be performed, and the card 2 stops there. Thus, the card 2 stops at first so as to be away from the stopper 24, as shown in FIG. 4; and subsequently, the card 2 is so moved again in either direction to come close to the stopper 24, or to move away from the stopper 24, as to change a resonance frequency, an impedance value, and the like. Incidentally, in the present embodiment, the card 2 is held by the couples of rollers while being transferred (transported), and therefore, stop positions and transfer distances of the card 2 can be set and changed arbitrarily. Furthermore, when being in stop, the card 2 is sandwiched and held by the couple of rollers 16 and 17. Accordingly, when communicating with the reader-side non-contact communication antenna 23, the card 2 is not moved by any disturbance so that the communication can steadily be performed.

As shown in FIG. 4A, the card 2 inserted through the card insertion slot 11 stops, being away from the stopper 24, in the area where the communication with the reader-side non-contact communication antenna 23 can be performed. More specifically, the driving motor 20 is so controlled by means of a controller such as a CPU or other suitable control device placed in the circuit board 22 as to get started to turn the belt in a predetermined direction. Then, the turning operation of the belt rotates the driving shaft through the intermediary of the pulley or the gear 21 assembled on the driving shaft, and then the turning movement is transmitted to each driving shaft through the pulleys and the belt in order to drive the couples of transfer rollers for receiving (holding) and transferring the card 2. Thus, the card 2 inserted through the card insertion slot 11 is sent toward a rear section of the card reader 1. In the meantime, the CPU detects the position of the card 2 inside the transfer path by using the encoder and the position detecting sensor described above, and stops the card 2 just before the card 2 comes in contact with the stopper 24. Then, the card 2 in stop condition performs communication with the reader-side non-contact communication antenna 23.

Then, if there happens an error in the non-contact communication to disable the non-contact communication, the card 2 further moves either in the direction to move away from the stopper 24 (See FIG. 4B), or in the direction to come close to the stopper 24 (See FIG. 4C), and stops there. Subsequently, the card 2 tries there to perform communication with the reader-side non-contact communication antenna 23 again. More specifically, the CPU controls the driving motor 20 to rotate the driving roller 16. Then, the card 2 is held by the couple of transfer rollers 16 and 17 to further move for a predetermined distance, and subsequently sending/receiving information is carried out between the card 2 and the reader-side non-contact communication antenna 23. On this occasion, the distance, for which the card 2 is moved, can be saved in an EEPROM that is prepared beforehand. Moreover, making use of an output from the encoder and/or the position detecting sensor described above, the CPU can recognize whether or not the card 2 has moved for the predetermined distance.

In the descriptions on FIGS. 4A to 4C, the card 2 stopped is moved again only once. But, the present invention is not limited to this operation, and the card 2 may as well be moved repeatedly step by step. In reality, however, more number of times the card 2 is moved, more time the operation takes. Therefore, practically the card 2 is moved preferably 2 to 3 times at a maximum.

Figure 5:
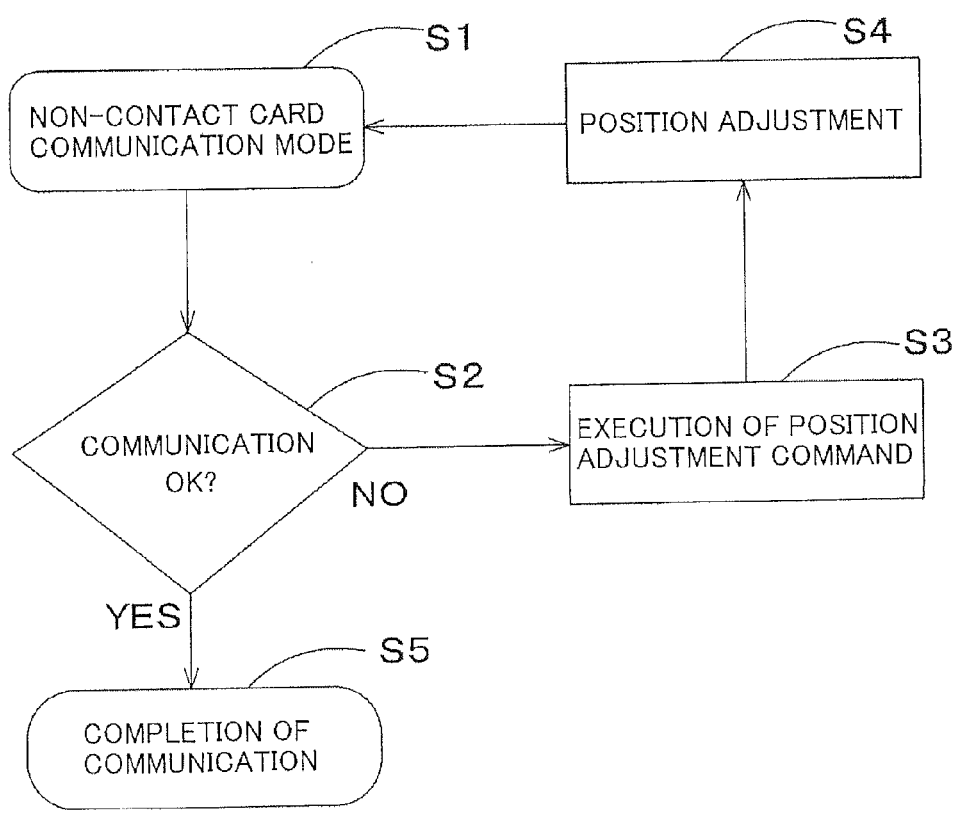
FIG. 5 is a flowchart showing an information processing flow of non-contact communication between a card reader and a card.

FIG. 5 is a flowchart showing an information processing flow of non-contact communication between the card reader 1 and the card 2.

In FIG. 5, the card 2 stops, being away from the stopper 24. Then, under condition of a non-contact card communication mode (Step S1), the CPU tries to communicate with the card 2 (Step S2). If the communication cannot be performed (Step S2: NO), the CPU executes a position adjustment command for the driving motor 20 (Step S3) through a motor driving circuit and the like, by using a result of error from the non-contact communication circuit as a trigger, to rotate the couple of transfer rollers 16 and 17 holding the card 2 for making an adjustment of the card 2 (Step S4). Then, the communication is retried (From Step S1 to S2). If the non-contact communication with the card 2 is successful (Step S2: YES), the communication completes (Step S5) and the operation ends.

As described above; according to the card reader 1 of the present embodiment, when an error happens in non-contact communication to disable the non-contact communication (Step S2: NO in FIG. 5), the card 2 held by the couple of transfer rollers 16 and 17 can be moved back and forth (toward the front side and the rear side) along the transfer path to change the resonance frequency, the impedance value, and the like. As a result, this operation is able to materialize a condition under which the communication with the card can be performed, and consequently a chance of successful communication can be improved. Furthermore, even under a condition where exists any inconvenience in the non-contact card communication through automatic card transfer (in terms of specifications of the IC, the antenna form, and the like) or variation in characteristics of the card within the scope of standards, it is an advantage that the position adjustment of the card 2 can be carried out autonomously. Moreover, since the card 2 stops at a position away from the stopper 24, the card 2 can be kept away from being damaged.

For adding a non-contact communication function to an existing card reader, sometimes it may be necessary to install the reader-side non-contact communication antenna 23 at a rear side section of the transfer path. Even in such a case, since the card 2 stops at a position away from the stopper 24 (The card 2 may once stop tentatively on the premise that it is further moved), the position of the card 2 for the non-contact communication can be made adjustable. As a result, probability of disabled non-contact communication can be decreased.

As described above, the card reader according to the present invention is useful since it can perform non-contact communication accurately even if there exists variation in characteristics of non-contact IC cards.

While the description above refers to particular embodiments of the present invention, it will be understood that many modifications may be made without departing from the spirit thereof The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. A card reader for use with a card having a card-side non-contact communication antenna, the card reader comprising:
    a reader-side non-contact communication antenna structured to communicate with the card-side non-contact communication antenna;
    a transfer path through which the card is transferred;
    a transfer mechanism structured to transfer the card through the transfer path;
    a controller structured to control the transfer mechanism; and
    a regulator structured to regulate the transfer of the card;
    wherein the reader-side non-contact communication antenna is provided in the proximity of the transfer path;
    the regulator is positioned in an area such that the reader-side non-contact communication antenna can communicate with the card-side non-contact communication antenna; and
    the controller is structured to control the transfer mechanism to move the card closer to the regulator or away from the regulator after the card has stopped once, so as to enable communication between the reader-side non-contact communication antenna and the card-side non-contact communication antenna.

2. The card reader according to claim 1;
    wherein the card stops, being away from the regulating means.

3. The card reader according to claim 1;
    wherein the regulator is located in the proximity of an end of the transfer path in a card inserting direction.

4. The card reader according to claim 1;
    wherein the controller is structured to control the transfer mechanism to repeatedly move the card step by step closer to the regulator or away from the regulator so as to enable communication between the reader-side non-contact communication antenna and the card-side non-contact communication antenna.

5. The card reader according to claim 1, wherein the regulator and the reader-side non-contact communication antenna are configured such that a center of the reader-side non-contact communication antenna cannot be positioned opposite to a center of the card-side non-contact communication antenna when the card abuts the regulator.

6. A card reader for use with a card having a card-side non-contact communication antenna, the card reader comprising:
a non-contact information processing means for recording/reproducing information through electromagnetic induction without physical contact with the card;
a transfer path through which the card is transferred;
a transferring means for transferring the card through the transfer path;
a control means for controlling the transfer means; and
a regulating means for regulating the transfer of the card;
wherein the non-contact information processing means is structured to communicate with the card-side non-contact communication antenna built in the card;
wherein the non-contact information processing means is provided in the proximity of the transfer path;
the regulating means is positioned in an area where the non-contact information processing means can communicate with the card-side non-contact communication antenna; and
the control means controls the transfer means to move the card closer to the regulating means or away from the regulating means after the card has stopped once, so as to enable communication between the non-contact information processing means and the card-side non-contact communication antenna.

7. The card reader of claim 1, further comprising a contact-type information processor structured to record/reproduce information by using at least one of a magnetic head and an IC contact that contacts the card.

8. The card reader of claim 6, further comprising a contact-type information processing means for recording/reproducing information by using at least one of a magnetic head and an IC contact that contacts the card.

9. The card reader according to claim 6, wherein the regulating means and the non-contact information processing means are configured such that a center of the non-contact information processing means cannot be positioned opposite to a center of the card-side non-contact communication antenna when the card abuts the regulating means.

10. A method for using a card having a card-side non-contact communication antenna with a card reader having a reader-side non-contact communication antenna, a card transfer path, and a regulator structured to regulate the transfer of the card, the method comprising:
inserting the card into the card transfer path;
transferring the card in a direction toward the regulator;
stopping the card;
performing communication between the reader-side non-contact communication antenna and the card-side non-contact communication antenna; and
when an error occurs and the communication is disabled, transferring the card either in a direction away from the regulator or a direction toward the regulator so as to reestablish the communication.

11. The method of claim 10, wherein when the error occurs, the card is transferred repeatedly in the direction away from the regulator or the direction toward the regulator until the communication is reestablished.

12. The method of claim 10, wherein the regulator and the reader-side non-contact communication antenna are configured such that a center of the reader-side non-contact communication antenna cannot be positioned opposite to a center of the card-side non-contact communication antenna when the card abuts the regulator.

* * * * *